United States Patent

[11] 3,628,052

[72] Inventor James A. Mitchell
Paris, France
[21] Appl. No. 5,586
[22] Filed Jan. 26, 1970
[45] Patented Dec. 14, 1971
[73] Assignee Burroughs Corporation
Detroit, Mich.

[54] KEYBOARD CONTROLLED CIRCUITRY WITH ELECTRONIC INTERLOCK
6 Claims, 4 Drawing Figs.

[52] U.S. Cl. .......... 307/115, 307/143
[51] Int. Cl. .......... H01h 47/00
[50] Field of Search .......... 307/115, 113, 116, 117, 134, 139, 142, 143; 340/167, 147

[56] References Cited
UNITED STATES PATENTS 3,508,201 4/1970 Morale .......... 307/115 X

*Primary Examiner*—Herman J. Hohauser
*Attorneys*—Kenneth L. Miller and Edwin W. Uren

ABSTRACT: Relates generally to the production of electrical signals from a keyboard, the keys of which are operatively associated with one or more individual switching devices whose activation to conducting or nonconducting operating conditions is controlled by the displacement of the keys. The invention is more particularly directed to a keyboard protective device characterized as an electronic interlock for causing signals from the keyboard to be ignored if two or more keys are simultaneously displaced by the operator. Means is provided for applying strobe pulses to the keyboard switches and for performing this operation in such a manner that adjacent keys are strobed on different channels. For the numerical input keys of the keyboard this is accomplished by separately strobing the odd and even valued keys because in the usual ten key keyboard the odd and even numbered keys are adjoining neighbors. The invention accomplishes the electronic interlock by detecting a concurrent strobe of the closed switches of the two adjoining depressed keys and utilizing such detection to warn the operator of a false entry and to cause the resulting output of the keyboard to be ignored.

INVENTOR.
JAMES A. MITCHELL.
BY Valzemond VS. Varker
ATTORNEY.

KEYBOARD CONTROLLED CIRCUITRY WITH ELECTRONIC INTERLOCK

CROSS REFERENCE TO RELATED APPLICATION

The embodiment of the invention herein disclosed is incorporated into the keyboard mechanism illustrated in the copending patent application of Nicholas Kondur, Jr. of common ownership herewith, Ser. No. 823,843, filed May 12, 1969, and entitled Keyboard Mechanism and Associated Code Converting Circuitry.

BACKGROUND OF THE INVENTION

This invention is directed to that field of art pertaining to code converting apparatus and particularly to keyboard mechanism in which key actuated entries in one notation, such as decimal, are converted and transduced into electrical signals in another notation, such as binary.

Many forms of mechanical keyboard interlocks have been employed in the past for preventing two or more keys of the keyboard from being actuated concurrently, the keyboard interposing a mechanical lock on all remaining keys when one is actuated. Attempts have also been made in the past for electrically signaling the operator that a faulty manipulation of two or more keys has occurred or for electrically delaying the output of a key until a preceding actuated key has returned to initial rest position. A first such keyboard circuit is illustrated in the U.S. Pat. No. 2,718,633 to Fennessy where the operator is warned of the fact that two or more keys are concurrently actuated. A second such keyboard circuit is illustrated in the U.S. Pat. No. 3,454,147 to Schrem where provision is made for storing a signal generated by an actuated key, and therefore not passing it to an associated calculator, until a key generating a preceding signal has returned to its normal starting position. The operation of this last mentioned circuit presupposes that the actuation of both keys is intended and accordingly would store and transmit a signal of an accidentally displaced key occurring during the time a selected key is actuated.

SUMMARY OF INVENTION

An important object of this invention is to provide an improved keyboard interlocking circuit designed to ignore the outputs resulting from the concurrent or overlapping actuation of two or more keys of the keyboard.

Another important object of the invention is to provide an improved keyboard circuit of the character aforesaid which can be produced and operated at substantially reduced costs and is highly reliable and durable.

A further important object of the invention is to provide an improved electronic interlock for keyboards which is effective in nullifying signals to a utilization device when neighboring keys on the keyboard, whether horizontally or vertically disposed with respect to one another, are simultaneously actuated.

In carrying out the objects of the invention, the invention avails itself of the logic of the electronic readout of the keyboard, such as illustrated in the aforesaid Kondur patent application, and functions to detect the existence of concurrent outputs from two adjacent keys of the keyboard and generates a signal which not only advises the operator of such undesirable keyboard action but also nullifies the results therefrom, thus forestalling the transmission of erroneous data to the utilization device which the keyboard is associated with.

More specifically, the objects of the invention are effectively and economically carried in cooperation with a plural number of electronic strobe pulse sources for reading out the keyboard, two such sources being utilized in the herein described embodiment of the invention. One such strobe source is connected to one series of alternatingly positioned keys on the keyboard, the even digit keys in the numeric section of the keyboard for example, and the other strobe source is connected to the other series of alternatingly positioned keys of the keyboard, the odd digit keys in the numeric section of the keyboard for example. The key interlocking circuit of this invention avails itself of the presence of the two or more strobe sources provided for reading out the keyboard and senses or detects the concurrent operation thereof as evidence of faulty coincident operation of neighboring keys of the keyboard. Furthermore, the interlocking circuit will generate a signal which tells the associated equipment to ignore the outputs from such keys and flashes a warning signal to the operator.

DESCRIPTION OF A PREFERRED EMBODIMENT OF THE INVENTION

Figure 1:
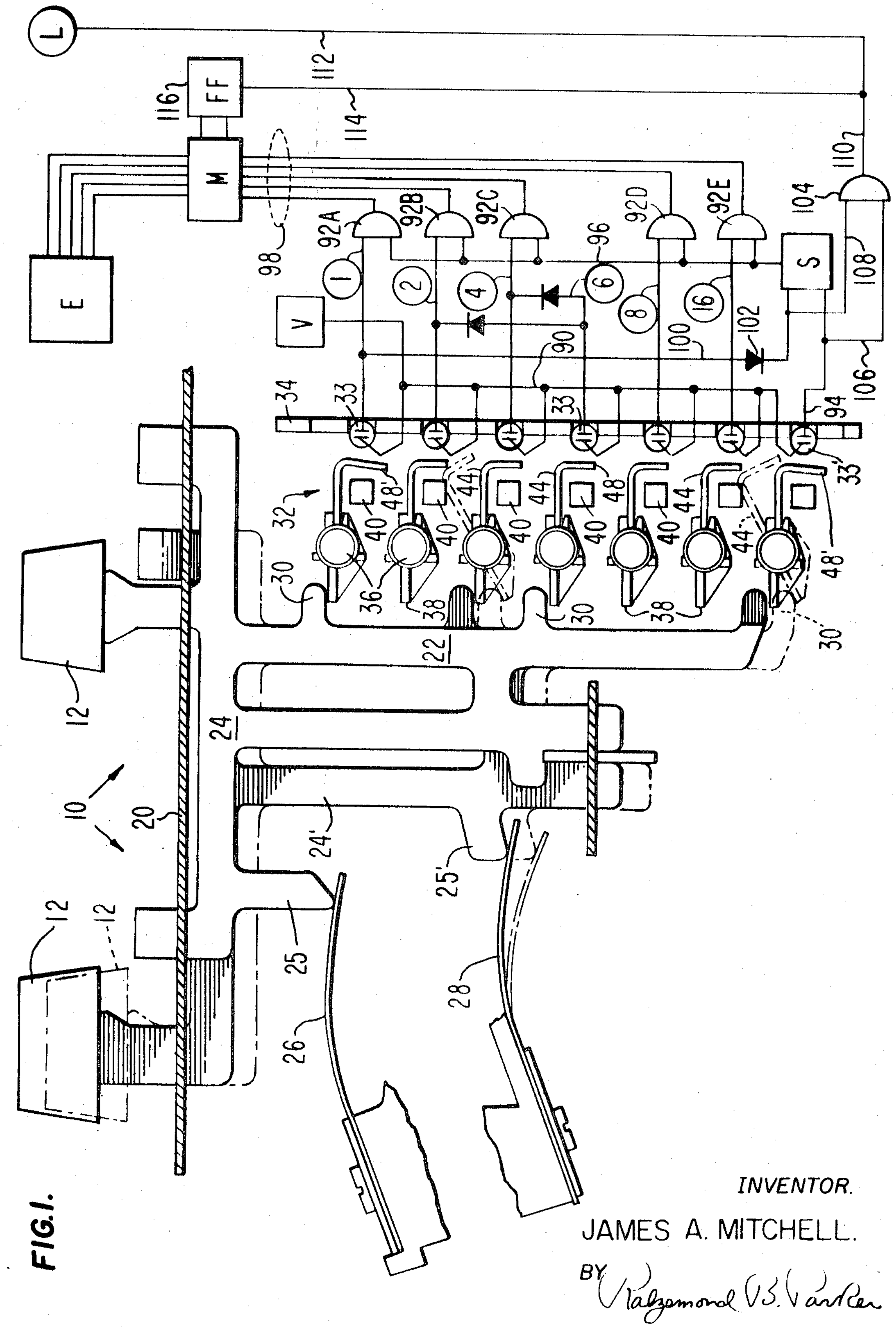
FIG. 1 is a diagrammatic view of a keyboard code converting and transducing mechanism of a machine embodying the invention and showing the circuitry for performing the electronic interlock.
Figure 2:
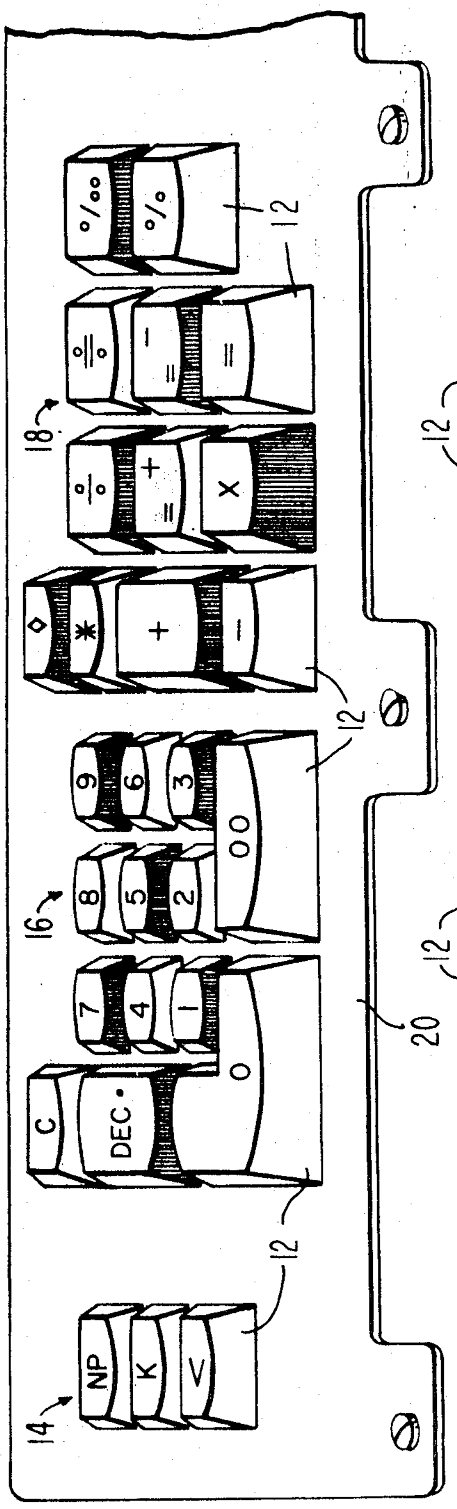
FIG. 2 is a perspective view of the keyboard of the machine showing the disposition of the keys thereon and their respective identifying markings.

An embodiment of the invention, as applied to the keyboard mechanism illustrated in the aforesaid Kondur patent application, is illustrated in the various accompanying Figures. With reference to FIGS. 1 and 2, the keyboard generally indicated at 10 comprising a plurality of keys 12 conventionally depressed by application of finger pressure on their respective key buttons. As shown in FIG. 2, the keyboard is subdivided into three sections of keys, a small mode select key group 14 at the left end of the keyboard has general control of the machine, a larger section 16 serves to enter numeric data into the machine, and a similar size section 18 serves to provide operator control over the various functions of the machine. The keys 12 of the keyboard rise above a platform 20 serving as a cover plate for the machine which as illustrated herein lies in a horizontal plane. The cover plate together with the keyboard could be slightly slanted toward the operator, a design practice frequently adopted in business machines of this character.

Each key 12 is depressible in response to finger pressure moving, as illustrated by the full and dotted line positions of he left key in FIG. 1, from a normal raised position to a fully depressed condition. Although the keys 12 are arranged in columns and rows as illustrated in FIG. 2, their respective code converting elements 22, hereinafter referred to as code bars, are all arranged to move in response to key actuation in a common substantially vertical plane extending transversely of the machine. To provide this arrangement, the key stems 24 are each so constructed below the cover plate 20 as to dispose their respective code bars 22 in this vertical plane. Downward movement of the keys is yieldingly resisted by the provision of leaf spring members herein shown at 26 and 28 each of which act on extensions 25 and 25' of alternately positioned key stems 24 and 24' respectively. This provision is a common practice in the art and no further comment is deemed necessary. It is apparent that once finger pressure is removed from a key, its associated spring 26 or 28 will exert force to return the key to its normal raised position on the keyboard.

Figure 3:
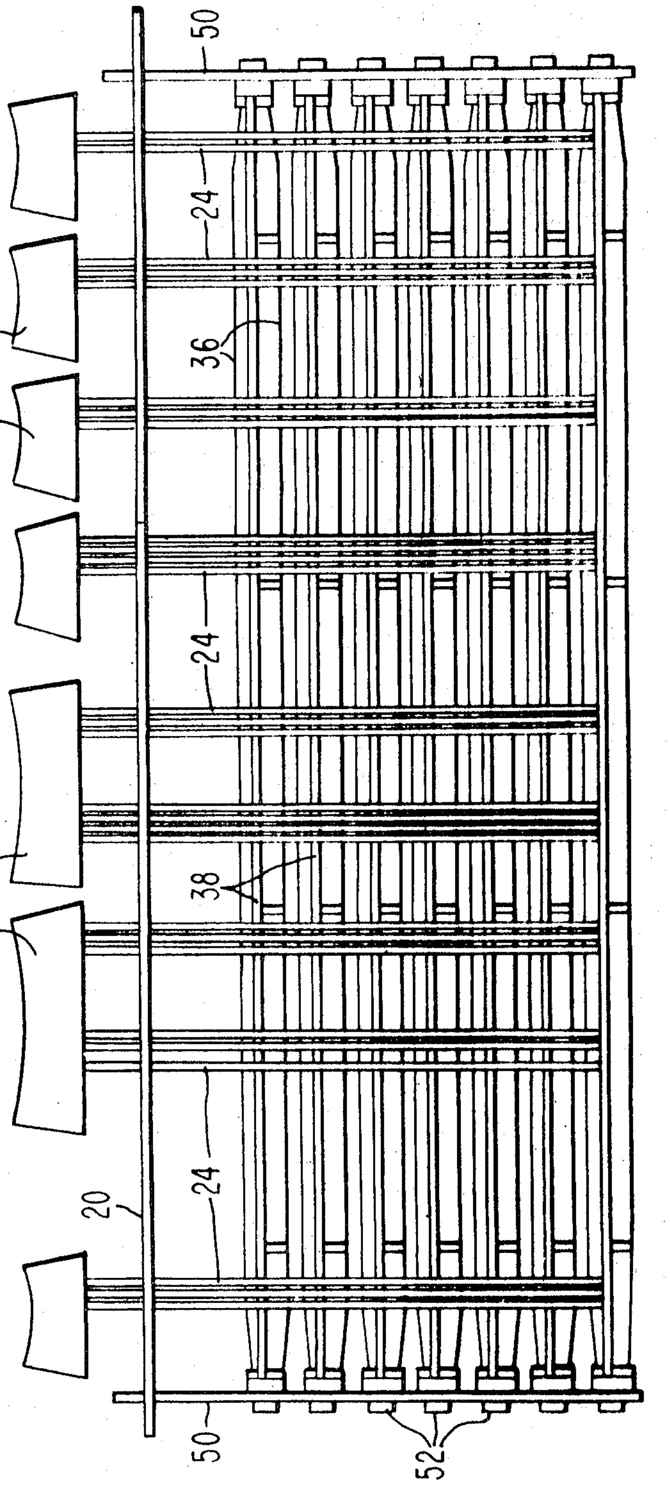
FIG. 3 is an interior view of the machine directed rearwardly thereof and particularly showing the relation of the vertical extending key stems and code bars to the horizontal extending code bails.

Two key members 12 and their respective key stems 24 and 24' and code bars 22 are illustrated in FIG. 1, it being understood that additional keys and their respective stems and code bars are stacked in side by side relation with their respective code bars 22 all being mounted for movement in a common vertical plane extending generally parallel to the rear side of the machine. On each code bar 22 there are one or more projections 30 formed integrally therewith which, as shown in FIG. 1, extend in the direction of the rear side of the machine. The number and position of these projections 30 differ for each code bar so that each code bar is individually representative of its associated key and distinguishable from all other code bars in the machine. FIG. 3 is a view of the machine looking rearwardly thereof and showing the key stems 24 and particularly their grouping with respect to the several columns of keys on the keyboard 10. The key stems and associated code bars of each column are shown grouped together in a close side by side relationship leaving relatively large spaces between the column groupings. Moreover as shown in FIG. 3, the key stems are usually offset to the central part of each key 12, a physical displacement having no effect on the operation thereof and usually being invisible from the exterior of the machine.

Figure 4:
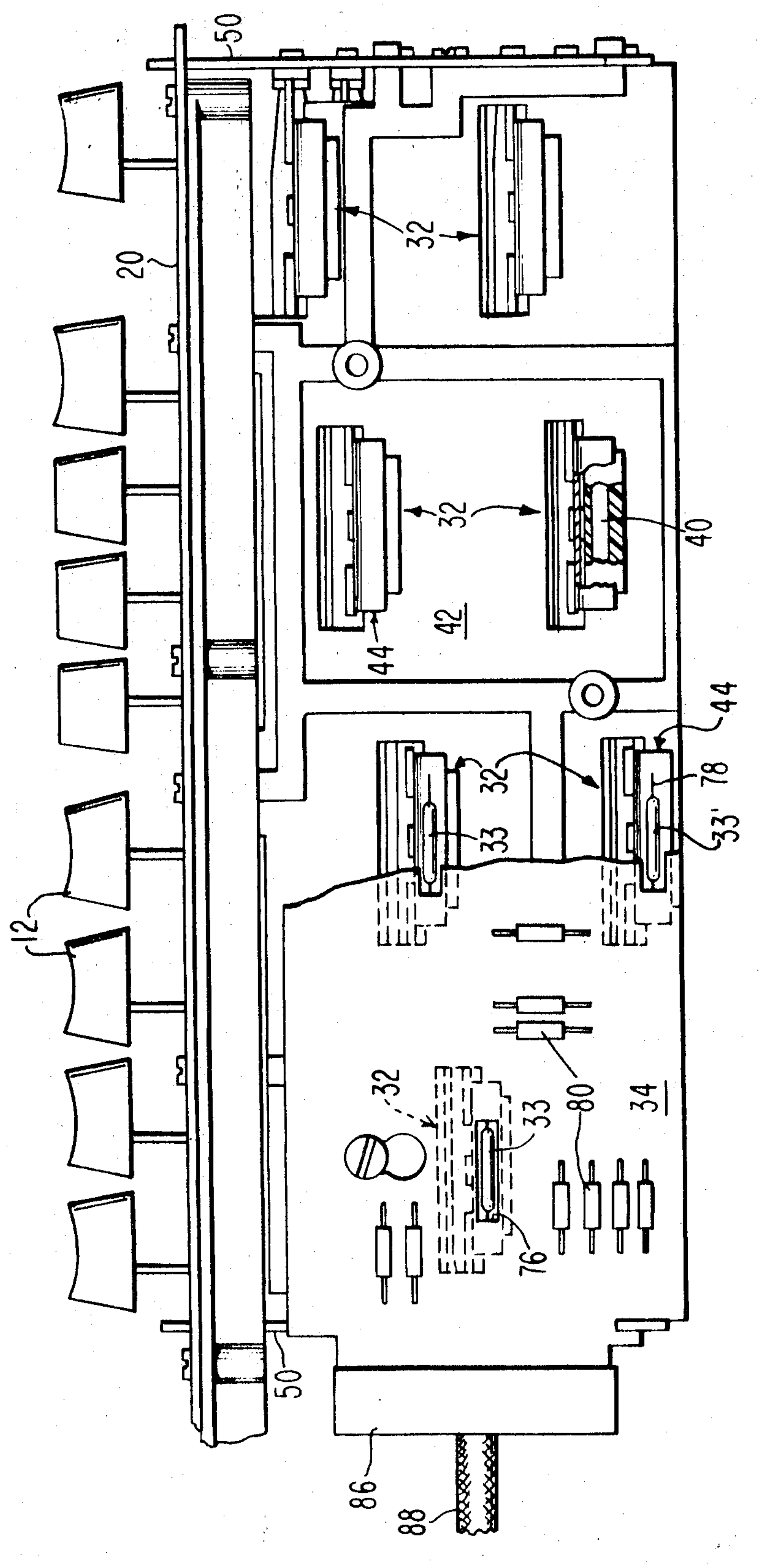
FIG. 4 is a view of the machine as shown from the rear thereof and being partly broken away to illustrate the last two rearmost panels and operating elements associated therewith.

Along the rear side of the machine, and spaced from the plane of the code bars 22, is a provision for mounting a plurality of magnetic transducing assemblies for converting the mechanical positions of any depressed key to electrical signals representative of such selected key. Seven of such transducing assemblies 32 are employed in the machine illustrated herein for the keyboard 10, and they appear in the diagrammatic view of FIG. 1 as if arranged in a single vertical column. Actually, as illustrated in FIG. 4 these seven assemblies 32 are spread laterally apart in stepped relation along the rear of the machine. Each transducing assembly includes an electrical switch element which is herein shown as a magnetically influenced dry reed contact unit 33. The reed switches are all mounted on a back panel 34 and may be partially recessed in the panel on the side thereof facing toward the front end of the machine. Each reed switch may be of conventional construction including an elongated glass envelope enclosing a pair of flexible contacts lying approximately along the longitudinal axis of the envelope with their adjacent ends in overlapping relationship.

Disposed between the rear panel 34 and the code bars 22 is a vertical assembly of individually rockable members or bails 36 pivotally mounted for rotation about individual axes extending parallel to one another in a common vertical plane and horizontally crosswise to the code bars 22. Seven such bails 36 are provided, one associated with each reed switch 32, and may extend completely across the machine from one side to the other side as shown in FIG. 3. Each code bail has a provision 38 extending toward the code bars 22 and into the path of travel of the projections 30 on the latter. As evident in FIG. 1, the projections 30, when their code bar is depressed, will abut certain of these extensions 38 and cause the associated bails to rock about their axes to positions corresponding to the dotted positions shown in dashed lines for two of the bails in FIG. 1. In this manner, it is evident that the code bars can permutatively operate one or more of the code bails to provide an encoded pattern representative of each key of the keyboard.

A plurality of permanent bar magnets 40 are arranged in a vertical plane between the code bails 36 and the panel 34 carrying the reed switches 33 as indicated in FIG. 1. In the machine illustrated herein, seven such magnets are employed with one associated with each reed switch in each transducing assembly. The magnetic field created by each magnet 40 is sufficient to affect its associated reed switch causing the switch elements therein to engage one another and place the switch in closed circuit condition. It is preferred to mount all of the magnets in a common plane and employ for this purpose a panel 42 formed of nonmagnetic material such as molded plastic and located forwardly of and parallel to the panel 34 carrying the reed switches.

The magnetic influence of each magnet on its associated reed switch is modified by a magnetic shunt or shield member 44 which also forms part of each transducing assembly and is carried by the code bail 36 thereof. Each magnetic shunt 44 is herein illustrated as exhibiting an L-shaped configuration including a horizontal portion 46 overlying its associated magnet 40 and a substantially vertical rear portion 48 capable of extending vertical downward between the magnet and the reed switch 33 with which it is paired. The opposite or forward end of each shunt member 44 is secured to the rear side of its code bail 36. It is evident from FIG. 1 that when a code bail 36 is rocked about its axis by a projection 30 on one of the code bars, it will swing its shunt member 44 upwardly to the dotted position shown for two of the shunts in FIG. 1, in which attitude the vertical portion 48 of the shunt is completely withdrawn from the space between its associated magnet and reed switch. In one operating condition of the transducing assembly, the presence of the shunt portion 48 between the magnet and reed switch acts to inhibit the magnetic field from affecting the latter thereby allowing the contact elements of the reed switch to assume a spaced apart opened circuit condition, and in the other operating condition the shunt portion is swung out of this space enabling the magnetic field to envelop and influence the reed switch to bring its contact elements into engagement thus closing the circuit. It is understood, however, that the action of the reed switch elements may be reversed with respect to the position of the shunt portion 48, engaging one another to close the circuit when the shunt is swung into position between the magnet and the reed switch and springing into circuit opened condition when the shunt is swung out of the way and the reed switch.

Other features of the physical structure of the illustrated embodiment of the invention include side plates 50—50 which, as shown in FIGS. 3 and 4, cover the sides of the machine and serve as supports for various elements of the assembly. As illustrated in FIG. 3, the ends of the rocking bails 36 are cylindrical shaped as at 52 and extend through circular openings in the side plates. In this manner, each bail is pivotally journaled for at least the extent of movement illustrated in FIG. 1. The code bails are formed of nonmagnetic material and preferably of molded plastic material each providing a light weight slightly flexible structure extending across the space between the side plates. The extension 38 of each code bail facing the code bars preferably takes the form of an elongated ridge or flange running the full length of the bail between the opposite side plates of the machine as shown in FIG. 3.

Connected to the reed switch contact elements in the envelope and projecting axially from the opposite ends thereof are leads or conductors 78. These leads are secured to printed wiring elements on the inner face of the panel 34 which may take the form of a printed circuit board for supporting the reed switches. The printed wiring elements serve to connect the reed switches to one another and to equipment external of the machine. Other electronic components may be carried on the outer or back face of the printed circuit board as indicated at 80 in FIG. 4. As in conventional practice, one or both ends of the printed circuit board 34 may be provided with terminals and be shaped to fit into a connector 86 from which a cable 88 containing a plurality of wire leads for connection to external equipment.

FIG. 1 schematically illustrates the circuitry, which may be constituted by the printed wiring on the back panel 34, for reading out the reed switches carried thereby. As disclosed in the aforesaid Kondur application, means may be provided for performing this operation only after assurance that the switches are stabilized in readout condition. With reference to FIG. 1, the first six reed switches counted from the top have inputs connected to a source of voltage "V" by means of a common lead 90 and have their respective outputs marked with the binary digit values "1," "2," "4," "6," "8," and "16" as shown circled in FIG. 1. These outputs are connected individually to a series of AND gates 92A to 92E. The last or seventh switch, identified for future reference herein as 33′, has its output 94 connected to a strobe pulse generator or enabler "S" which, when switch 33′ is closed, will cause such strobe source to apply electrical pulses by conductor 96 to the series of AND gates 92A to 92E. It is evident that an output pulse will occur from each AND gate upon concurrent receipt of a strobe pulse from source "S" and a signal from source V signifying the closure of the gate's respective switch. Pulses will therefore appear on the outputs 98 of the gates of those switches which are closed, and such signals may be conveyed to a keyboard monitor circuit schematically indicated at "M" which adapts these signals for use by external equipment, such as a calculator or computer "E," with which the keyboard mechanism is associated.

As explained in the hereinabove cited Kondur patent application, a substantial reduction in the number of switch closures required for keyboard operation is accomplished in part by creating a "six" bit value for one of the reed switches 33, as indicated by the legend "6," and connecting its output through appropriate diodes with the outputs "2" and "4" of the reed switches representing such values. In other words, the six bit decimal representation is OR'd with the two and four bit reed switches. The six bit value can now be produced by closing the "6" reed switch instead of the "2" and "4" reed switches as would be conventional practice. By the creation of this six bit reed switch it is also possible to indicate the seven bit value by simply closing the reed switches representing the "1" and "6" rather than the three reed switches "1," "2" and "4," as heretofore in the use of the four binary digit values, 1, 2, 4 and 8.

A distinctive feature of the invention is the employment of the "1" digit value reed switch not only to further reduce the number of switch closures necessary for the operation of this keyboard mechanism as explained in the referenced Kondur patent application, but also to serve as a second strobe pulse source for the keyboard. This is achieved by having the "1" digit value reed switch function as a separate strobe initiating switch. In attaining the objects of this invention, the output of the "1" reed switch is connected by conductor 100 to the strobe pulse enabler "S" switch through an unidirectional current control device or diode 102. In other words, connected in this fashion for triggering the strobe source "S," the "1" reed switch not only performs its value representing function but also serves as a strobe initiating switch for those reed switches with which it is associated for providing certain binary coded decimal signals to the utilization equipment with which the keyboard mechanism is associated.

There are thus provided two strobe initiating switches in the keyboard readout circuit, the earlier mentioned reed switch 33′ operated by the lowest bail of the keyboard mechanism, and the "1" digit value switch operated in this instance by the highest bail of the mechanism. These two switches and their respective leads and connections to the strobe pulse enabler or source S serve as separate instrumentalities for enabling or strobing the AND gates 92A and 92E. The five reed switches whose outputs are designated by the encircled numbers "2," "4," "6," "8" and "16" represent even valued outputs from the keyboard and the entry of any even number or value in the keyboard will therefore not require the closure of the reed switch having the odd "1" value. Accordingly, all even numbered keys of the keyboard, or those assigned an even value, are provided with means for rocking only the lowest bail to actuate the reed switch 33′ and employ this channel for initiating the strobing action. For this purpose the code bars 22 associated with the even valued keys of the keyboard are provided with a bottom lateral extension or lobe for tripping the lowest bail, one such being shown in dotted outline at 30′. For all of the even valued keys there is therefore no provision for actuating the highest bail and the associated switch 33 having the encircled "1" output.

However, for the odd numbered keys of the keyboard, or those assigned an odd value, it is necessary in this arrangement to utilize the "1" value switch as the means for initiating the strobing action. Therefore, to assure activation of the "1" value reed switch and not the lowest reed switch 33′, the code bars 22 activated by the odd valued keys of the keyboard are all provided with a lobe 30 at their upper ends for rocking the topmost bail in order to close the "1" switch, but have no provision for rocking the lowest bail for closing the switch 33′. It is therefore evident that two strobing channels are provided, one for strobing the odd valued keys and the other for strobing the even valued keys.

In keyboards having keys for making numeric entries for computation purposes, the keys are usually arranged in rows and columns as well as in numeric sequence as illustrated by the numeric section 16 of the present keyboard. Moreover, the sequence usually positions the keys so that the numeric values which they represent are alternatingly odd and even numbers whether considered in the horizontal direction of the rows or the vertical direction of the columns. For illustrative purposes, this alternate disposition is accentuated in FIG. 2 by the shading applied to the odd numbered keys of the keyboard section 16. This alternate disposition of the keys is carried over into the operator control section 18 of the keyboard where those keys which are assigned odd numerical values are shaded as also illustrated in FIG. 2.

The invention recognized that this alternate positioning of the odd and even valued keys of the keyboard, coupled with the provisions for separately strobing the same during readout of the mechanism provided the possibility of not only warning the operator of a faulty actuation of two adjoining keys but also for nullifying the readout from the keyboard in such an event. This is accomplished by the incorporation of a detector in the keyboard circuit which senses the enabling or strobing of the odd and even keys of the keyboard and generates a signal when it detects concurrent strobing of both types of keys. Such a signal would be generated when two adjacent keys, an odd and an even value key, are depressed and is utilized not only to notify the operator of this faulty manipulation of the keyboard but also to control the transmission of the resulting code signals from the depressed keys. For this purpose it will be noted in FIG. 1 that an AND gate 104 is incorporated into the keyboard circuitry and has two inputs 106 and 108, the first of which is connected to the output 94 of the switch 33′ and the second of which is connected to the strobe connection 100 for the "1" switch. The AND gate 104 has its output 110 provided with branch leads, one of which represented by conductor 112 is connected to a lamp L or other operator signaling device. The remaining branch lead 114 is connected to a flip flop 116 controlling the monitor M. It is evident that when two adjacent keys in either section 16 or 18 of the keyboard are depressed at the same time they will activate both strobing circuits and will apply concurrent signals on the inputs of the AND gate 104 thus producing an outgoing signal to the warning lamp L and to the monitor controlling flip-flop 116.

The flip-flop 116 is so connected into the monitor circuit that when actuated it will cause the monitor to disregard any signals coming out of the keyboard and thereby prevent their transmission to external equipment represented by the unit C. The flip-flop operation may be accomplished in any conventional manner. The flip-flop may normally assume an inactive state, but upon receipt of a signal from the AND gate, which may last as long as the concurrent actuation of the two adjacent keys, the flip-flop will assume its other state and control the monitor so as to cause it to ignore signals arriving from the keyboard. At the same time the warning lamp L will be lighted. The control of the monitor by the flip-flop would be exercised until the operator depressed the clear key C on the keyboard which is connected to the flip-flop for resetting the same. The monitor and flip-flop are shown as components separate and apart from the external equipment E. In many instances, these two control devices would be incorporated into the equipment E with which the keyboard mechanism is associated.

In the presently described embodiment of the invention, the numeric keys forming section 16 of the keyboard and illustrated in FIG. 2 include the ten keys "0" to "9" and further include keys "00" meaning double zero and "DEC." meaning decimal point. As shown in FIG. 2, the single cipher key "0" is L-shaped around the "1" key for convenient accessibility. A single depression of the double cipher key "oo" will enter two consecutive zeros into the mechanism. Physically associated with the numeric section 16 on the keyboard but not considered as a numeric entry key is a clear key "C" which is usually actuated by the operator after an alarm condition arises. The depression of this key will clear any amount indexed into the mechanism and restore operation of the keys.

In order to further separate the outputs of the remaining two groups of keys from numeric section 16, sections 14 and 18 of operator control keys employ sixteen as the lowest binary value. In other words, the twelve operator control keys in section 18 and the three mode select keys in section 14 are all assigned binary values from the 16 bit and higher. Included in this category of keys is the clear key "C" previously mentioned which may be assigned the highest binary value.

As disclosed in the aforesaid Kondur patent application, means is provided for performing the keyboard operations only after assurance that all switches actuated by the bails are stabilized in readout condition. For this purpose the magnetic shunt 44 associated with the "1" reed switch and the shunt 44 associated with the strobe activating reed switch 33′ are each respectively elongated to the same extent beyond the shunts associated with the remaining reed switches. The elongated shunts will delay the affect of the magnetic fields on the "1" reed switch and on the reed switch 33′ thereby delaying the closure of these switches and the resulting strobing action until after those reed switches having shorter controlling shunts are closed. It is thus apparent that the two strobe controlling switches will trigger the logic circuitry to read out those reed switches associated with the remaining bails which have reached a bounce free, stabilized, closed condition.

In the illustrated embodiment of the invention, key symbols are employed on the key tops of the keys of the keyboard sections 14, 16 and 18 illustrated in FIG. 2. The numeric keys of section 16 are arranged in accordance with a present standard layout with the exception of the shape and location of the single and double cipher keys. In this embodiment, factors to be added, subtracted, multiplied or divided are entered by depressing sequentially from left to right the listing keys of section 16 representing the numeric digits of the factors to be operated upon. The mode and functional control keys of sections 14 and 18, as well as their respective symbols signifying their use, may be varied. Thus, the keyboard of FIG. 2 is merely illustrative of one arrangement for which the invention is adapted. Indicator lamps may be located on the keyboard, including, for example, lamp L for indicating an erroneous manipulation of the keys and others (not shown) for indicating the selected mode of operation of the mechanism.

While a particular embodiment of the invention has been shown and described, it will be understood, of course, that it is not desired that the invention be limited thereto since modifications may be made. The foregoing explanation is therefore by way of illustration only. It is, therefore contemplated by the appended claims to cover any such modifications as fall within the true spirit and scope of the invention.

What is claimed is:

1. Keyboard mechanism comprising, in combination:

a plurality of actuatable keys arranged in rows and columns;

a plurality of electrical switches;

means responsive to the actuation of any selected key of the mechanism for permutatively closing a different one or more of the switches to provide a distinctive coded representation of the key;

means for producing a strobe pulse and applying the same to the switches in order to provide electrical signals on the outputs of those switches which are closed;

means electrically associated with the switches closed by one set of alternatingly positioned keys on the keyboard for initiating said strobe pulse producing means;

separate means electrically associated with the switches closed by a second set of keys on the keyboard which intervene between those of the first set for initiating said strobe pulse producing means; and means responsive to the strobing of the switches initiated by the concurrent actuation of keys in both said sets for generating a control signal.

2. The invention defined in claim 1 characterized in that a strobe initiating switch is associated with each said set of keys which can be closed only by keys in its respective set.

3. The invention defined in claim 1 characterized in that means is provided which responds to the generation of said control signal for nullifying the output signals from the switches closed as a result of the concurrent actuation of keys in both of said sets of keys.

4. Keyboard mechanism comprising; in combination:

a keyboard of actuatable odd valued keys and actuatable even valued keys arranged in crossing rows and columns;

a plurality of electrical switches;

means responsive to the actuation of any selected key of the mechanism for permutatively closing a different one or more of the switches to provide a distinctive code for each key;

means for producing a strobe pulse and applying the same to the switches in order to provide electrical signals on the outputs of those switches which are closed;

means electrically associated with the switches closed by the odd valued keys for initiating said strobe pulse producing means and separate means electrically associated with the switches closed by the even valued keys for initiating said strobe pulse producing means; and means for detecting the concurrent initiation of said strobing means by said first and second means and operable to nullify the output signals from the closed switches when the switches are strobed in such manner.

5. The invention defined in claim 4 characterized in that an odd valued key of the mechanism is assigned the value of "one" and that the odd value initiation of said strobe pulse producing means is responsive to the actuation of the "one" valued key.

6. The method of electrically interlocking the keys of a keyboard operating mechanism in which the keys are arranged in crossing rows and columns which comprises:

permutatively closing a different one or more of a plurality of electric switches upon actuation of any key in the keyboard mechanism;

electrically strobe pulsing those switches which are actuated to closed condition upon actuation of any key of one set of alternatingly positioned keys of the keyboard mechanism to produce signals on the outputs of those switches which are so closed;

electrically strobe pulsing those switches which are actuated to closed condition upon actuation of any key of a second set of keys of the keyboard mechanism which are alternatingly positioned with respect to the keys of the first set to produce signals on the outputs of those switches which are so closed; and employing the concurrent strobing of both sets of keys of the keyboard mechanism for causing the output signals from the closed switches of the keyboard mechanism to be ignored.

* * * * *